(12) United States Patent
Ehrman et al.

(10) Patent No.: US 8,392,888 B2
(45) Date of Patent: *Mar. 5, 2013

(54) METHOD OF TRANSLATING N TO N INSTRUCTIONS EMPLOYING AN ENHANCED EXTENDED TRANSLATION FACILITY

(75) Inventors: John R. Ehrman, Sunnyvale, CA (US);
Mike S. Fulton, Maple Ridge, CA (US);
Dan F. Greiner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/872,275

(22) Filed: Aug. 31, 2010

(65) Prior Publication Data

US 2010/0325401 A1 Dec. 23, 2010

Related U.S. Application Data

(63) Continuation of application No. 11/469,919, filed on Sep. 5, 2006, now Pat. No. 7,810,073.

(51) Int. Cl.
*G06F 9/44* (2006.01)
*G06F 9/45* (2006.01)
(52) U.S. Cl. .......... 717/126; 717/127; 717/141
(58) Field of Classification Search .......... 717/126–132, 717/140–143
See application file for complete search history.

(56) References Cited

U.S. PATENT DOCUMENTS

| | | | |
|---|---|---|---|
| 3,707,725 A | 12/1972 | Dellheim | |
| 5,287,490 A * | 2/1994 | Sites | 717/142 |
| 5,317,740 A * | 5/1994 | Sites | 717/129 |
| 5,437,037 A | 7/1995 | Furuichi | |
| 5,713,010 A | 1/1998 | Buzbee et al. | |
| 5,732,273 A | 3/1998 | Srivastava et al. | |
| 5,907,709 A * | 5/1999 | Cantey et al. | 717/141 |
| 6,014,517 A * | 1/2000 | Shagam et al. | 717/142 |
| 6,071,317 A | 6/2000 | Nagel | |
| 6,092,175 A | 7/2000 | Levy et al. | |
| 6,106,573 A | 8/2000 | Mahalingaiah et al. | |
| 6,131,154 A | 10/2000 | Kawasaki et al. | |
| 6,173,421 B1 | 1/2001 | Weaver Johnson et al. | |
| 6,308,318 B2 | 10/2001 | Krishnaswamy | |
| 6,397,379 B1 * | 5/2002 | Yates et al. | 717/140 |
| 6,618,855 B1 * | 9/2003 | Lindholm et al. | 717/126 |
| 6,634,019 B1 | 10/2003 | Rice et al. | |
| 6,907,598 B2 * | 6/2005 | Fraser | 717/127 |

(Continued)

OTHER PUBLICATIONS

Chi et al, "Reducing data access penalty using intelligent opcode driven cache prefetching", IEEE, pp. 512-517, 1995.*

(Continued)

*Primary Examiner* — Anil Khatri
(74) *Attorney, Agent, or Firm* — Cantor Colburn LLP; John Campbell (57) ABSTRACT

A method, article, and system for providing an effective implementation of assembler language translate-n-to-n instructions implemented on 21, 31, and 64-bit architectures, while maintaining backward compatibility with existing systems. The enhanced Extended-Translation Facility 2 (ETF2) instruction set introduces a new operand in an unused field ($M_3$) that facilitates a change in the original instruction format and its intended function. With the ETF2-Enhancement Facility installed, a value of zeros in the $M_3$ field indicates that instruction operation is to continue as originally defined. When a nonzero value is coded in the $M_3$ field a new function is carried out. The assembler accommodates the changes by making the new $M_3$ field optional when coding the instructions. If the $M_3$ field is not coded, the assembler defaults to providing zeros in the $M_3$ field (as found in the original instruction format), and backward compatible operation is provided.

20 Claims, 6 Drawing Sheets

U.S. PATENT DOCUMENTS

| | | | |
|---|---|---|---|
| 6,954,923 B1 * | 10/2005 | Yates et al. | 717/130 |
| 6,993,751 B2 | 1/2006 | Bhansali et al. | |
| 7,010,784 B1 | 3/2006 | Sentovich et al. | |
| 7,020,872 B1 * | 3/2006 | Goire et al. | 717/143 |
| 7,080,360 B2 | 7/2006 | Bates et al. | |
| 7,178,135 B2 | 2/2007 | Bates et al. | |
| 7,257,806 B1 | 8/2007 | Chen et al. | |
| 7,287,243 B2 * | 10/2007 | Dollin et al. | 717/126 |
| 7,308,458 B2 | 12/2007 | Vincent, III | |
| 7,320,123 B2 | 1/2008 | Govindarajapuram et al. | |
| 7,363,617 B2 | 4/2008 | Barsness et al. | |
| 7,383,396 B2 | 6/2008 | Wyman | |
| 7,421,681 B2 | 9/2008 | DeWitt, Jr. et al. | |
| 7,496,897 B1 * | 2/2009 | Dibble et al. | 717/127 |
| 7,516,304 B2 | 4/2009 | Ehrman et al. | |
| 7,526,755 B2 * | 4/2009 | DeLine et al. | 717/126 |
| 7,596,745 B2 | 9/2009 | Dignum et al. | |
| 7,644,395 B1 * | 1/2010 | Frey et al. | 717/128 |
| 7,665,015 B2 | 2/2010 | Dignum et al. | |
| 7,779,391 B2 * | 8/2010 | Greiner | 717/126 |
| 7,810,073 B2 * | 10/2010 | Ehrman et al. | 717/126 |
| 7,856,624 B2 * | 12/2010 | Plum | 717/140 |
| 7,984,304 B1 * | 7/2011 | Waldspurger et al. | 713/187 |
| 8,065,668 B2 * | 11/2011 | Bosworth et al. | 717/141 |
| 8,136,091 B2 * | 3/2012 | Erlingsson et al. | 717/121 |
| 2004/0003246 A1 | 1/2004 | Hopkins et al. | |
| 2004/0015832 A1 | 1/2004 | Stapp et al. | |

OTHER PUBLICATIONS

Chang, "Exploiting frequent opcode locality for power efficient instruction cache", ACM GLSVLSI, pp. 399-402, 2008.*

Corliss et al, "The implementation and evaluation of dynamic code decompression using DISE", ACM Trans. on Embedded Sys. vol. 4, No. 1, pp. 38-72, 2005.*

Lee et al, "Instruction set synthesis with efficient instrcution encoding for configurable processors", ACM Trans. on Design Auto. of Elec. Sys. vo. 12, No. 1, article 8, pp. 1-37, 2007.*

Benton et al.; "Compiling Functional Types to relational specifications fo rLow Level Imperative Code"; ACM TLDI, pp. 3-14; 2009.

Edson Bonn et al.; "Software-Based Transparent and Comprehensive Control-Flow Error Detection"; IEEE CGO, pp. 1-13; 2006.

Joao Dias et al.; "Automatically Generating Instruction Selectors using Declarative Machine Descriptions"; ACM POPL, pp. 403-416; 2010.

Xekalakis et al.; "Combining Thread Level Speculation, Helper Threads and Runhead Execution"; ACM ICS, pp. 410-420; 2009.

* cited by examiner

METHOD OF TRANSLATING N TO N INSTRUCTIONS EMPLOYING AN ENHANCED EXTENDED TRANSLATION FACILITY

CROSS-REFERENCE TO RELATED APPLICATIONS

This application is a continuation of U.S. patent application Ser. No. 11/469,919, filed on Sep. 6, 2006, the contents of which are hereby incorporated by reference herein in their entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

This invention relates generally to instruction implementation and register utilization within a computer processor, and more particularly to providing a method, article, and system for the effective implementation of translate-n-to-n instructions implemented on 24, 31, and 64-bit architectures, while maintaining backward compatibility with existing systems.

2. Description of the Related Art

Software has become a major portion of the cost associated with computer systems because it is very "labor-intensive." Some of this cost is due to the effort involved in writing and debugging programs; other costs involve maintaining programs after they have been written. Accordingly, considerable effort has been expended in order to reduce the time and costs involved with writing, debugging and maintaining moderate and large software programs. Much of this effort has been related to developing programming languages and programming techniques, which will allow programmers to build on or "reuse" programs and code segments that have been written by others.

Until very recently, software programming was heavily dominated by an approach referred to as "structured programming." Common software programming languages used in this approach were, and remain, BASIC, FORTRAN, COBOL, PL/1, and C. These are considered "higher order" languages that are written in human readable code and ultimately translated into machine or computer readable code by a compiler. Typically, structured programs have consisted of a combination of defined variables of specific data types, e.g. integer, real, and character, and a complimentary set of functions or routines, which operate on these variables. Often, a program would include sub-routines which are smaller routines within a program or larger routines that carry out certain operations, e.g. printing data in a given output format. The emphasis to this approach was inputs—functions—outputs and they were often represented as flowcharts by the designers, which logically represented how the program functioned and branched into different functional paths. As an increasing number of programs became large (tens of thousands of lines of code and above) structured programs became increasingly complex and difficult to write, troubleshoot and maintain.

In response to the unwieldy nature of structured programs and their related flowcharts, new approaches to software engineering called Object-Oriented Design (OOD) and Object-Oriented Programming (OOP) have emerged and gained increasing popularity among software developers. OOP promised greater reuse and maintainability than its structured programming predecessor because of an emphasis on well-defined and self-contained objects, rather than the structured programming emphasis on a proliferation of relatively loosely related data manipulating functions and subroutines.

Object Oriented Programming techniques involve the definition, creation, use and destruction of "objects." These objects are software entities comprising data elements, or attributes, and methods, or functions, which manipulate the data elements. The attributes and related methods are treated by the software as an entity and can be created, used and destroyed as if they were a single item. Together, the attributes and methods enable objects to model virtually any real-world entity in terms of the entity's characteristics, represented by the data elements, and the entity's behavior, represented by data manipulation functions or methods. In this way, objects can model concrete things like people and computers, and they can also model abstract concepts like numbers or geometrical designs. Object-Oriented Programming languages include C++, Java, as well as other languages.

As was previously mentioned the "higher order" programming languages (structured, object oriented) must ultimately be translated into machine or computer readable code by a compiler to carry out instructions to be executed by a computing device and/or processor.

Instruction sets used in computer systems employing so-called Complex Instruction Set Computing (CISC) architecture include both simple instructions (e.g. LOAD, or ADD) and complex instructions (e.g. PROGRAM CALL, or LOAD ADDRESS SPACE PARAMETERS). Typical complex instruction-set computers have instructions that combine one or two basic operations (such as "add", "multiply", or "call subroutine") with implicit instructions for accessing memory, incrementing registers upon use, or dereferencing locations stored in memory or registers. As an example to which the invention has particular relevance, see "The z/Architecture Principles of Operation" (Publication Number SA22-7831-04, available from IBM Corporation, Armonk, N.Y.), which is incorporated herein by reference in its entirety. As these computer systems (e.g. IBM System 390, IBM System z9) have become more powerful, larger percentages of the instruction set have been implemented using hardware execution units to increase system performance. Conventionally, the complex functions are implemented in microcode because building hardware execution units to execute them is expensive and error prone. A microcode/microprogram implements a central processing unit (CPU) instruction set. Just as a single high level language statement is compiled to a series of machine instructions (load, store, shift, etc), each machine instruction is in turn implemented by a series of microinstructions, sometimes called a microprogram.

The Extended-Translation Facility 2 (ETF2) is an instruction set introduced on the IBM series of z/900 processors. The z/900 processors are designed for use in high performance computer servers for data and transaction serving. The z/900 processors and associated computer servers are designed to support both 32 and 64 bit computations, as well as both structured and object oriented programming languages. The EFT2 performs operations on both single-byte and double-byte data. Single-byte data may be ASCII, EBCDIC, or other data that can be encoded in a single byte. The double-byte data may be Unicode data, which is data that uses binary codes of the Unicode Worldwide Character Standard and enables the use of characters of most of the worlds written languages. The facility consists of eleven instructions, which are documented in "z/Architecture Principles of Operation" (Publication Number SA22-7832-04, available from IBM Corporation, Armonk, N.Y.), which as previously stated is incorporated herein by reference in its entirety.

However certain ETF2 instructions, and in particular, the TRANSLATE ONE TO ONE, TRANSLATE ONE TO TWO, TRANSLATE TWO TO ONE, and TRANSLATE TWO TO TWO (hereafter referred to as translate-n-to-n instructions) have characteristics that make them particularly difficult to exploit in the Java environment.

Each of the translate-n-to-n instructions 600 (please see FIG. 6) is designed to translate the argument characters of a second operand 606 using a translation table 602 designated by general register 1 (GR1) 612. Translation proceeds until either a model-dependent number of characters have been processed or until the character selected from the translation table 602 matches a test character 616 specified in general register 0 (GR0) 614. Stopping on a test character 616 may be the expected result when translating text that has a predictable end character, for example a null, new-line, or carriage return. However, in certain environments such as Java, the test character may either be unpredictable or undefined. In such an environment, extra coding is required to establish a least-expected test character, manually translate if is it is encountered, and then resume translation following it.

In addition for TRANSLATE ONE TO ONE and TRANSLATE ONE TO TWO instructions, the translation table is defined as being doubleword aligned, which is a boundary that Java can easily accommodate. However, for TRANSLATE TWO TO ONE and TRANSLATE TWO TO TWO, the translation table is defined as being 4K-byte aligned. Java has no means of enforcing a 4K alignment on its users. In order to use the TRANSLATE TWO TO ONE or TRANSLATE TWO TO TWO instructions in Java, the system must copy the user-supplied translation table to a 4K-aligned temporary buffer and then execute the instruction. Copying a 64K or 128K translation table makes the use of the instructions impractical in a Java environment.

The present invention is directed to addressing, or at least reducing, the effects of, one or more of the problems set forth above, through the introduction of an enhanced version of EFT2.

SUMMARY

Embodiments of the present invention include an instruction set comprising instructions designed to translate the argument characters of a second operand using a translation table within a data processing system, with a higher level assembler, comprising: an operation code field, which identifies the instruction; a control field, which controls the operation of the instruction; and one or more general registers; where a first general register contains a test character, a second general register stores the address of the translation table, a third general register that stores the address of a first operand, and a fourth general register that contains the address of a second operand. The previously mentioned control field comprises a test-character-comparison control bit that determines whether test-character processing is performed by the instruction. When the test-character-comparison control bit is zero, test-character comparison is performed by the instruction. However, when the test-character-comparison control bit is one, test-character comparison is bypassed by the instruction. In addition, the control field is defined to be an optional operand to the high-level assembler, where the default value for the control field is zero if it is not specified, therefore ensuring backward compatibility of the instruction set with previous systems. The instruction set of the present invention is compatible with 24-bit, 31-bit, and 64-bit architectures.

Embodiments of the present invention also include a method to translate the argument characters of a second operand and using a translation table within a data processing system, where translation proceeds until a predetermined number of characters have been processed or until a character selected from the translation table matches a test character.

A system for implementing the method of the present invention, as well as, an article comprising one or more machine-readable storage media containing instructions that when executed enable a processor to carry out the method, are also provided.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The EFT2—enhancement facility extends the operation of the translate-n-to-n instructions, from the initial EFT2 release with the following modifications. Additional functionality is added to the TRANSLATE ONE TO ONE, TRANSLATE ONE TO TWO, TRANSLATE TWO TO ONE, and TRANSLATE TWO TO TWO instructions, allowing the test-character comparison to be bypassed. Previously unused bits of the instruction image are used to add a new $M_3$ operand to the translate-n-to-n instructions. A test-character-comparison control bit in the $M_3$ field controls whether test-character processing is performed by the instructions. When the test-character-comparison control is zero, test comparison occurs, which ensures compatibility with prior code that does not specify the new $M_3$ operand. The $M_3$ field is defined to be an optional operand for the translate-n-to-n instructions as defined to the higher-level assembler. The default value for the $M_3$ operand, if it is not specified, is zero, ensuring compatibility with the previous operation of the translate-n-to-n instructions of the non-enhanced EFT2. In addition, for TRANSLATE TWO TO ONE, and TRANSLATE TWO TO TWO, the alignment requirements for the translate table are relaxed. When the EFT2—enhancement facility is installed, the translation table specified by general register 1 (GR1) is assumed to be on a double-word boundary for all four of the translate-n-to-n instructions.

Table 1. summarizes the four translate-n-to-n instructions under the EFT2—enhancement facility.

TABLE 1

TRANSLATE ONE TO ONE

TROO $R_1$, $R_2$ [,$M_3$]        [RRF]

| 'B993' | $M_3$ | | $R_1$ | $R_2$ |
|---|---|---|---|---|
| 0 | 16 | 20 | 24 | 28  31 |

TRANSLATE ONE TO TWO

TROT $R_1$, $R_2$ [,$M_3$]        [RRF]

| 'B992' | $M_3$ | | $R_1$ | $R_2$ |
|---|---|---|---|---|
| 0 | 16 | 20 | 24 | 28  31 |

TRANSLATE TWO TO ONE

TRTO $R_1$, $R_2$ [,$M_3$]        [RRF]

| 'B991' | $M_3$ | | $R_1$ | $R_2$ |
|---|---|---|---|---|
| 0 | 16 | 20 | 24 | 28  31 |

TRANSLATE TWO TO TWO

TRTT $R_1$, $R_2$ [,$M_3$]        [RRF]

| 'B990' | $M_3$ | | $R_1$ | $R_2$ |
|---|---|---|---|---|
| 0 | 16 | 20 | 24 | 28  31 |

Table 2 shows the attributes of the four translate-n-to-n instructions under the EFT2—enhancement facility.

TABLE 2

TRnn Operand Attributes

| Mnemonic | Opcode | Character Size (in bytes) | | | | Translate-Table Size (in bytes) |
| | | 1st Operand | 2nd Operand | Function Character | Test Character | |
|---|---|---|---|---|---|---|
| TROO | B993 | 1 | 1 | 1 | 1 | 256 |
| TROT | B992 | 2 | 1 | 2 | 2 | 512 |
| TRTO | B991 | 1 | 2 | 1 | 1 | 64K |
| TRTT | B990 | 2 | 2 | 2 | 2 | 128K |

Table 3 shows the format of the $M_3$ field when the EFT2-enhancement facility is installed.

TABLE 3

| | | C |
|---|---|---|
| 0 | | 3 |

The bits of the $M_3$ field are defined as follows:
Unassigned: Bits 0-2 are unassigned and should contain zeros to ensure future program operational compatibility.
Test-Character-Comparison Control (C): The C bit, bit 3 of the $M_3$ field, controls test-character comparison. When the C bit is set to zero, test-character comparison is performed. When the C bit is one, test-character comparison is not performed.

Note: When the ETF2-enhancement facility is not installed, the $M_3$ field is ignored.

When the ETF2-enhancement facility is not installed, or when the test-character-comparison control is zero, the function character selected from the translation table is compared to a test character in general register 0, and, unless an equal comparison occurs, is placed at the first-operand location. The operation proceeds until a selected function character equal to the test character is encountered, the end of the second operand (the characters of the second operand are used as arguments to select function characters from a translation table designated by the address in general register 1) is reached, or a CPU-determined number of characters have been processed, whichever occurs first.

Alternatively, when the ETF2-enhancement facility is installed and the test-character-comparison control is one, test-character comparison is not performed. Each function character selected from the translation table is placed at the first operation location. The operation proceeds until the end of the second operand is reached, or a CPU-determined number of characters have been processed, whichever occurs first. The result of the operation is indicated in the condition code.

The lengths of the operand and test characters for the four translate-n-to-n instructions under the EFT2—enhancement facility are as follows:
For TRANSLATE ONE TO ONE, the second-operand, first-operand, and test characters are single bytes.
For TRANSLATE ONE TO TWO, the second-operand characters are single bytes, and the first-operand and test characters are double bytes.
For TRANSLATE TWO TO ONE, the second-operand characters are double bytes, and the first-operand and test characters are single bytes.
For TRANSLATE TWO TO TWO, the second-operand, first-operand, and test characters are double bytes.

Figure 1:
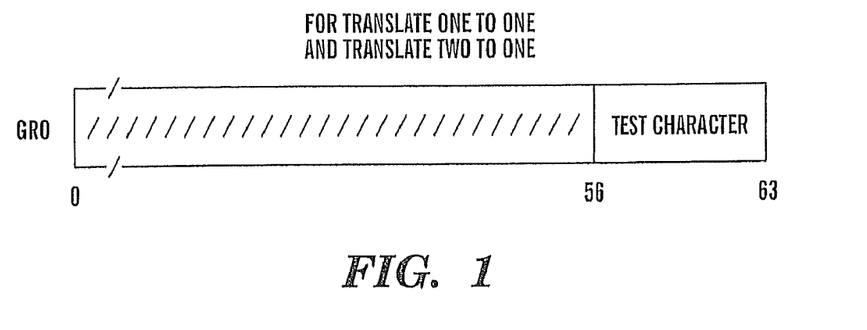
FIG. 1 is a block diagram of the configuration of general register 0 (GR0) for TRANSLATE ONE TO ONE and TRANSLATE TWO TO ONE instructions according to an embodiment of the present invention.
Figure 2:
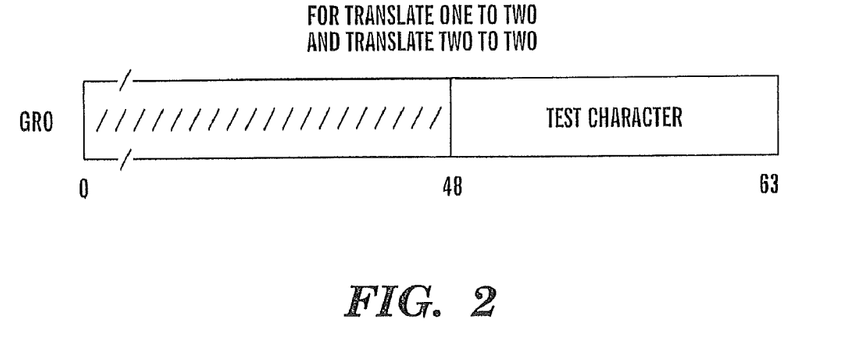
FIG. 2 is a block diagram of the configuration of general register 0 (GR0) for TRANSLATE ONE TO TWO and TRANSLATE TWO TO TWO instructions according to an embodiment of the present invention.

For TRANSLATE ONE TO ONE and TRANSLATE TWO TO ONE, the test character is in bit positions 56-63 {24-31} of general register 0 (please see FIG. 1). For TRANSLATE ONE TO TWO and TRANSLATE TWO TO TWO, the test character is in bit positions 48-63 {16-31} of general register 0 (please see FIG. 2).

Note: The $R_1$ field designates an even-odd pair of general registers and must designate an even-numbered register; otherwise a specification exception is recognized. Bit positions or counts enclosed in braces { } are for architectures where the registers are limited to 32 bits.

Figure 3:
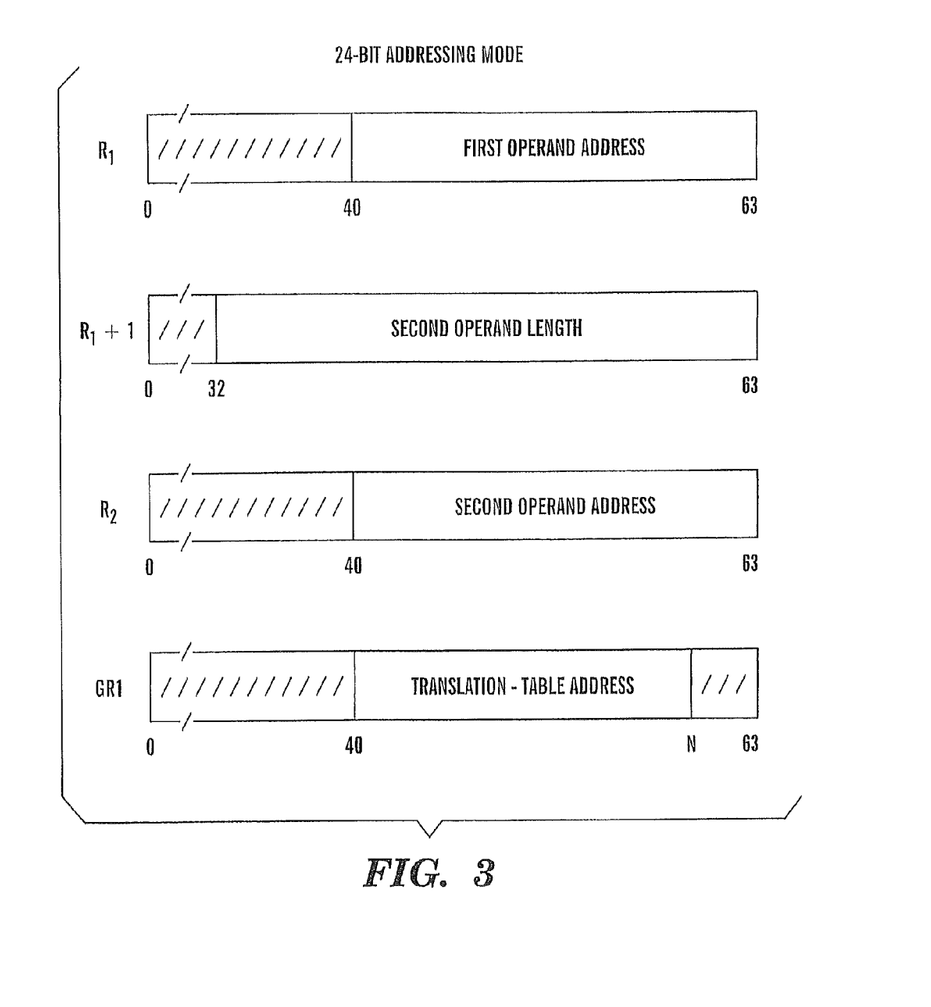
FIG. 3 is a block diagram of the handling of addresses in registers $R_1$, $R_1+1$, $R_2$, and general register 1 (GR1) in the 24-bit addressing mode according to an embodiment of the present invention.
Figure 4:
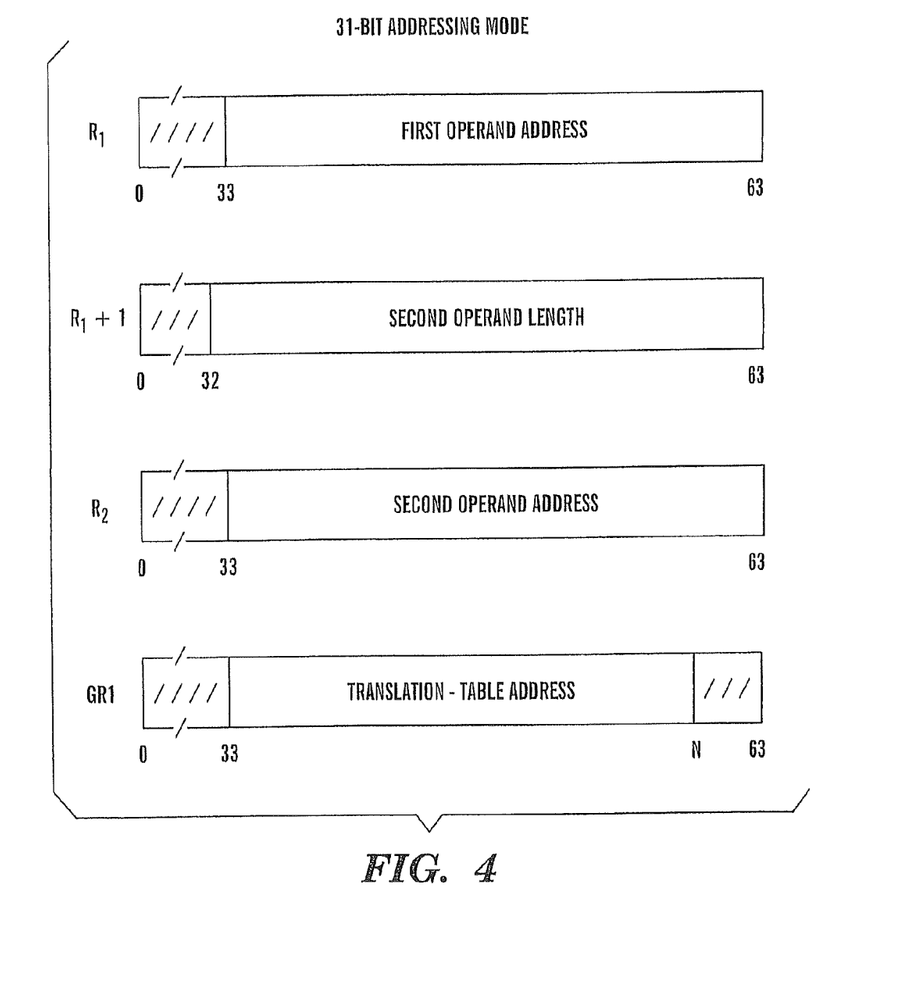
FIG. 4 is a block diagram of the handling of addresses in registers $R_1$, $R_1+1$, $R_2$, and general register 1 (GR1) in the 31-bit addressing mode according to an embodiment of the present invention.
Figure 5:
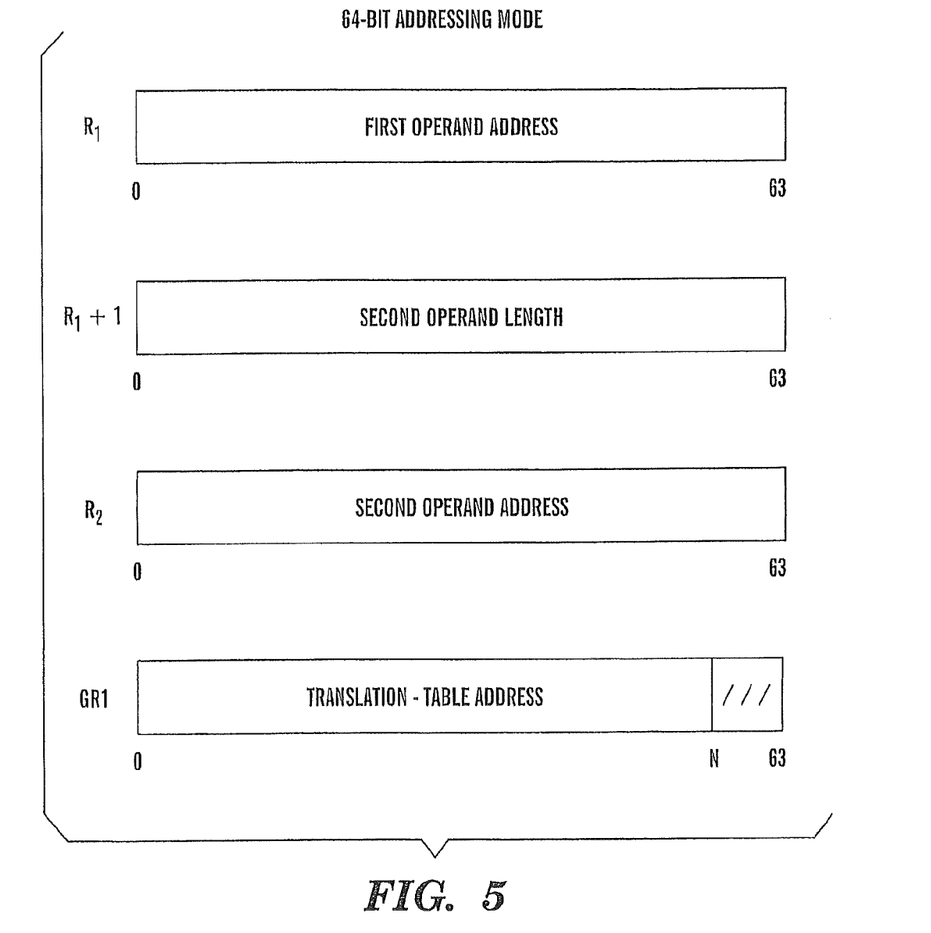
FIG. 5 is a block diagram of the handling of addresses in registers $R_1$, $R_1+1$, $R_2$, and general register 1 (GR1) in the 64-bit addressing mode according to an embodiment of the present invention.

Referring to FIGS. 3-5, the location of the leftmost byte of the first operand and second operand is designated by the contents of general registers $R_1$ and $R_2$, respectively. In the 24-bit (please see FIG. 3) or 31-bit (please see FIG. 4) addressing mode, the number of bytes in the second-operand location is specified by the contents of bit positions 32-63 of general register $R_1+1$, and these contents are treated as a 32-bit unsigned binary integer. In the 64-bit (please see FIG. 5) addressing mode, the number of bytes in the second-operand location is specified by the contents of bit positions 0-63 of general register $R_1+1$, and those contents are treated as a 64-bit unsigned integer. The length of the first-operand location is considered to be the same as that of the second operand for TRANSLATE ONE TO ONE and TRANSLATE TWO TO TWO, twice that for TRANSLATE ONE TO TWO, and one half that for TRANSLATE TWO TO ONE. For TRANSLATE TWO TO ONE and TRANSLATE TWO TO TWO, the length in general register $R_1+1$ must be an even number of bytes; otherwise, a specification exception is recognized. The letter N, in FIGS. 3-5 specifying a bit position, has the following meanings:

When the ETF2-enhancement facility is not installed, N is 61 for TRANSLATE ONE TO ONE and TRANSLATE ONE TO TWO, and N is 52 for TRANSLATE TWO TO ONE and TRANSLATE TWO TO TWO.

When the ETF2-enhancement facility is installed, N is 61.

The translation table is treated as being on a doubleword boundary for TRANSLATE ONE TO ONE and TRANSLATE ONE TO TWO. For TRANSLATE TWO TO ONE and TRANSLATE TWO TO TWO, the translation table is treated as follows:

When the ETF2-enhancement facility is not installed, the translation table is treated as being on a 4K-byte boundary.

When the ETF2-enhancement facility is installed, the translation table is treated as being on a doubleword boundary.

The rightmost bits of the register that are not used to form the address, which are bits 61-63 {29-31} in the doubleword case and bits 52-63 {20-21} in the 4K-byte case, are ignored but should contain zeros; otherwise, the program may not have future compatibility.

The handling of the addresses in general registers $R_1$, $R_2$, and 1 is dependent on the addressing mode. In the 24-bit addressing mode (FIG. 3), the contents of bit positions 40-63 {8-31} of general registers $R_1$ and $R_2$ and 40-60 {8-28} or 40-51 {8-19} of 1 constitute the address, and the contents of bit positions 0-39 {0-7} are ignored. In the 31-bit addressing mode (FIG. 4), the contents of bit positions 33-63 {1-31} of registers $R_1$ and $R_2$ and 33-60 {1-28} or 33-51 {1-19} of 1 constitute the address, and the contents of bit positions 0-32 {0} are ignored. In the 64-bit addressing mode (FIG. 5), the contents of bit positions 0-63 of registers $R_1$ and $R_2$ and 0-60 or 0-51 of 1 constitute the address.

In the access-register mode, the content of access registers $R_1$, $R_2$, and 1 are used for accessing the first operand, second operand, and translation table, respectively.

The length of the translation table designated by the address contained in general register 1 is as follows:

TRANSLATE ONE TO ONE, the translation-table length is 256 bytes; each of the 256 function characters is a single byte.

For TRANSLATE ONE TO TWO, the translation-table length is 512 bytes; each of the 256 function characters is a double byte.

For TRANSLATE TWO TO ONE, the translation-table length is 65,536 (64K) bytes; each of the 64K function characters is a single byte.

For TRANSLATE TWO TO TWO, the translation-table length is 131,072 (128K).

The characters of the second operand are selected one by one for translation, proceeding left to right. Each argument character is added to the initial translation-table address. The addition is performed following the rules for address arithmetic, with the argument character treated as follows:

For TRANSLATE ONE TO ONE, the argument character is treated as an eight-bit unsigned binary integer extended on the left with 56 {24} zeros.

For TRANSLATE ONE TO TWO, the argument character is treated as an eight-bit unsigned binary integer extended on the right with a zero and on the left with 55 {23} zeros.

For TRANSLATE TWO TO ONE, the argument character is treated as a 16-bit unsigned binary integer extended on the left with 48 {16} zeros.

For TRANSLATE TWO TO TWO, the argument character is treated as a 16-bit unsigned binary integer extended on the right with a zero and on the left with 47 {15} zeros.

The rightmost bits of the translation-table address that are ignored (61-63 {29-31} or 52-63 {20-31}) are treated as zeros during this addition. The sum is used as the address of the function character.

When the ETF2-enhancement facility is not installed, or when the test-character-comparison control is zero, processing is as follows. Each function character selected as described above is first compared to the test character in general register 0. If the result is an equal comparison, the operation is completed. If the function character is not equal to the test character, the function character is placed in the next available character position in the first operand, that is, the first function character is placed at the beginning of the first-operand location, and each successive function character is placed immediately to the right of the preceding character. The second operand and the translation table are not altered unless an overlap occurs. The operation proceeds until a selected function character equal to the test character is encountered, the second-operand location is exhausted, or a CPU-determined number of second-operand characters have been processed.

When the ETF2-enhancement facility is installed and the test-character-comparison control is one, processing is as described above, except that no test-character comparison is performed.

When a selected function character equal to the test character is encountered, condition code 1 is set. When the second-operand location is exhausted without finding a selected function character equal to the test character, condition code 0 is set. When a CPU-determined number of characters have been processed, condition code 3 is set. Condition code 3 may be set even when the next character to be processed results in a function character equal to the test character or when the second-operand location is exhausted. In these cases, condition code 1 or 0, respectively, will be set when the instruction is executed again. When the ETF2-enhancement facility is installed and the test-character-comparison control is one, condition code 1 does not apply.

If the operation is completed with condition code 0, the contents of general register $R_2$ are incremented by the contents of general register $R_1+1$, and the contents of general register $R_1$ are incremented as follows:

For TRANSLATE ONE TO ONE and TRANSLATE TWO TO TWO, the same as for general register $R_2$.
    For TRANSLATE ONE TO TWO, by twice the amount for general register $R_2$.
    For TRANSLATE TWO TO ONE, by one half the amount for general register $R_2$. The contents of general register $R_1+1$ are then set to zero.

If the operation is completed with condition code 1, the contents of general register $R_1+1$ are decremented by the number of second-operand bytes processed before the character that selected a function character equal to the test character was encountered, and the contents of general register $R_2$ are incremented by the same number, so that general register $R_2$ contains the address of the character that selected a function character equal to the test character. The contents of general register $R_1$ are incremented by the same, twice, or one half the number, as described above for condition code 0.

If the operation is completed with condition code 3, the contents of general register $R_1+1$ are decremented by the number of second-operand bytes processed, and the contents of general register $R_2$ are incremented by the same number, so that the instruction, when re-executed, contains the address of the next character to be processed. The contents of general register $R_1$ are incremented by the same, twice, or one half the number, as described above for condition code 0.

When general registers $R_1$ and $R_2$ are updated in the 24-bit or 31-bit addressing mode, the bits in bit positions 32-39 of them that are not part of the address may be set to zeros or may remain unchanged from their original values. In the 24-bit or 31-bit addressing mode, the contents of bit positions 0-31 of general registers $R_1$, $R_1+1$, and $R_2$ always remain unchanged. The contents of general registers 0 and 1 remain unchanged.

The CPU on the basis of improving system performance determines the amount of processing that results in the setting of condition code 3, and it may be a different amount each time the instruction is executed.

During instruction execution, CPU retry may result in condition code 3 being set with possibly incorrect data having been stored in the first operand location at or to the right of the location designated by the final address in general register $R_1$. The amount of data stored depends on the operation and the point in time at which CPU retry occurred. In all cases, the storing will occur again, with correct data stored, when the instruction is executed again to continue processing the same operands.

Unpredictable results can occur in the following situations:
    When the register designating the first operand is the same register as that designating the second operand (that is, the destination and source fields overlap).
    When the registers designating the first or second operand is register 0 (that is, the first or second operand register is the same as the register containing the test character).
    When the register designating the second operand is register 1 (that is, the second-operand register is the same as the register containing the translation-table address).

Access exceptions for the portion of the first or second operand to the right of the last character processed may or may not be recognized. For an operand longer than 4K bytes, access exceptions are not recognized for locations more than 4K bytes beyond the last character processed. Access exceptions for all characters of the translation table may be recognized even if not all characters are used. Access exceptions are not recognized if the $R_1$ field is odd. When the length of the second operand is zero, no access exceptions for the first or second operand are recognized, and access exceptions for the translation table may or may not be recognized.

Figure 6:
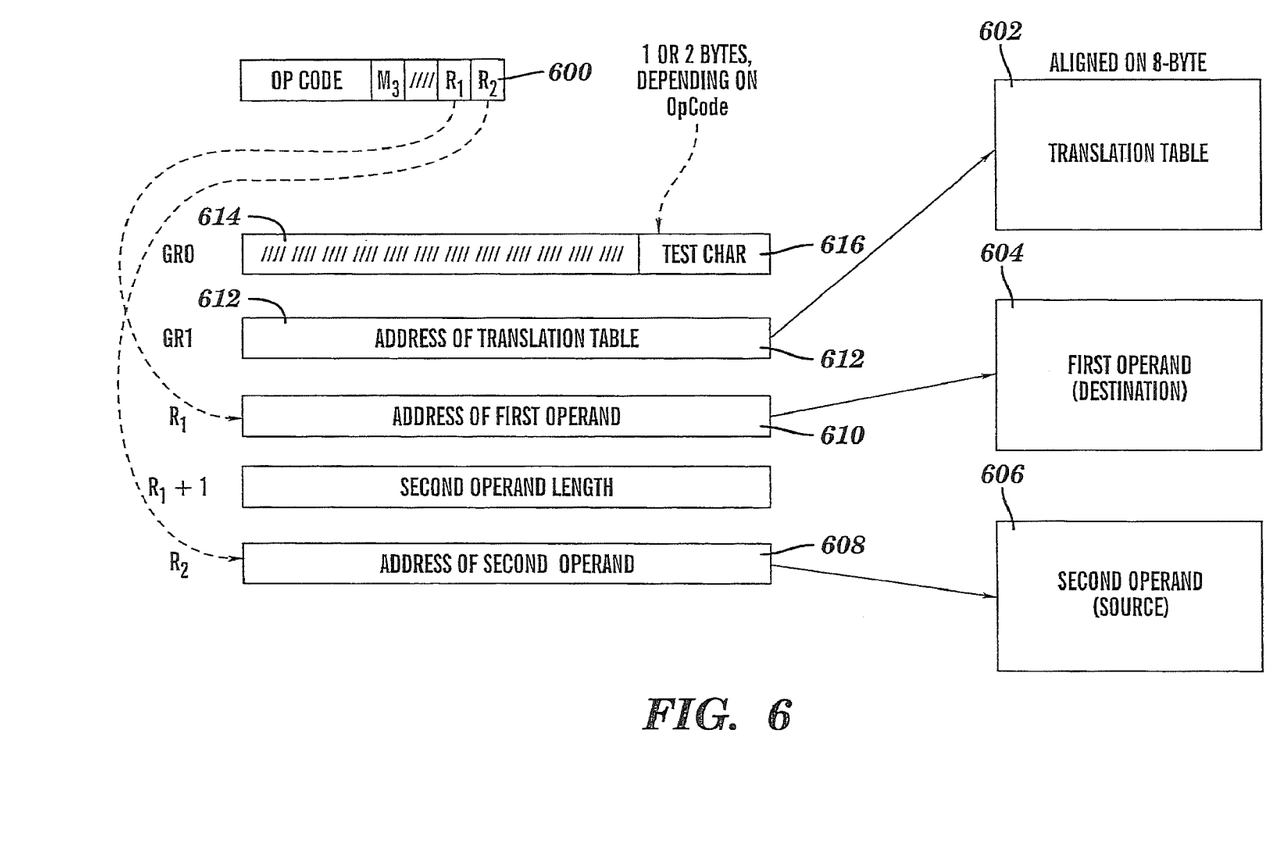
FIG. 6 is a block diagram depicting the operation of the TRANSLATE n TO n instructions according to an embodiment of the present invention.
Figure 7:
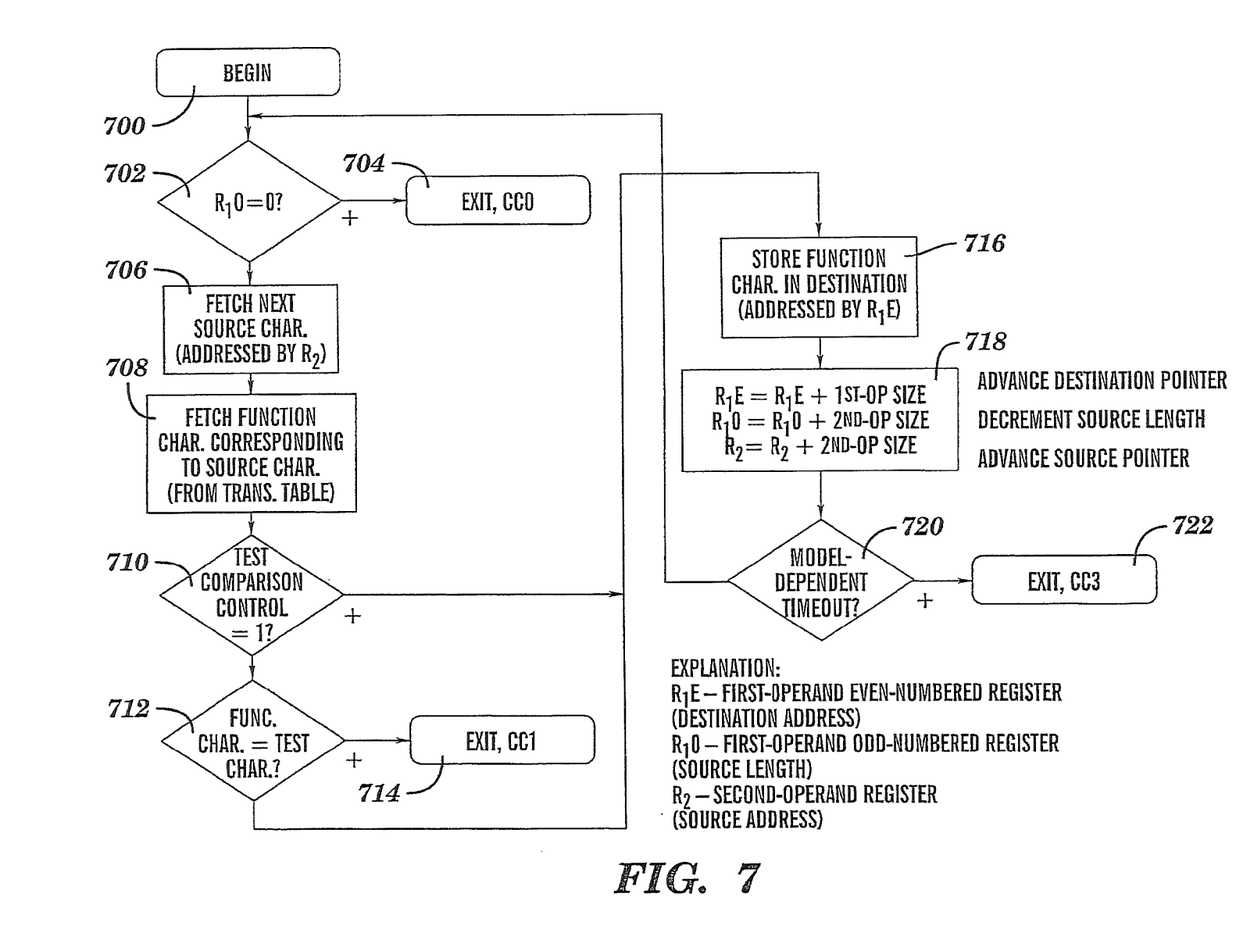
FIG. 7 is a flow chart depicting the processing of TRANSLATE n TO n instructions according to an embodiment of the present invention.

Turning now to FIG. 7, a flow diagram 700 depicting the processing of a TRANSLATE n TO n instruction 600 of FIG. 6 is shown. At step 702 the value of the first operand of an even-numbered register 610 (destination address) is determined. If the value is equal to zero the operation is exited and a condition code zero (CC0) is set (704). If the value is not equal to zero the next source character 606 addressed by register $R_2$ 608 at step 706. At step 708 the function character corresponding to the source character 606 is fetched from the translation table 602 which has an address contained in general register 1 (GR1) 612. At step 710 when the ETF2-enhancement facility is installed and the test-character-comparison control is one, no test-character comparison is performed (712), and the function character is stored in a destination address (step 716) determined from the first operand 604 of an even-numbered register 610. If the test-character-comparison control is not equal to 1, step 712 is performed to test if a selected function character is equal to the test character. If there is an equivalence condition code 1 is set, and the instruction is exited. If there is no equivalency, the function character is stored in a destination address (step 716) determined from the first operand 604 of an even-numbered register 610. At step 718 the advanced destination pointer is updated, the source length is decremented, and the source pointer is advanced. The operation proceeds until the end of the second operand is reached, or a CPU-determined number of characters have been processed 720, whichever occurs first. If the CPU-determined number of characters has been processed, the instruction is exited and condition code three (CC3) is generated.

The flow charts/diagrams depicted herein are just examples. There may be many variations to these charts/diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for executing a translate instruction, the translate instruction comprising an opcode field and a test character control field, the method comprising:
   responsive to the test character control field indicating that a test character comparison is to be performed, performing for successive argument characters of a predetermined number of argument characters:
      retrieving an argument character;
      based on the retrieved argument character, identifying a function character in a translation table of function characters;
      responsive to the identified function character being different than a predetermined test character, placing the identified function character into a first operand; and
      responsive to the identified function character being equal to the predetermined test character, performing:
         not placing the identified function character into the first operand; and
         setting a condition code indicating that a function character was equal to the predetermined test character; and
   responsive to the test character control field indicating that a test character comparison is not to be performed, performing for successive argument characters of the predetermined number of argument characters:
      retrieving an argument character;
      based on the retrieved argument character, identifying a function character in the translation table of function characters; and
      placing the identified function character into the first operand.

2. The method of claim 1, wherein the opcode field indicates a size of the argument characters, the size of the argument characters equal to one byte or two bytes.

3. The method of claim 1, wherein the opcode field indicates a size of the predetermined test character, the size of the predetermined test character equal to one byte or two bytes.

4. The method of claim 1, wherein the opcode field indicates a size of the first operand, the size of the first operand equal to one byte or two bytes, and wherein the size of the identified function character is equal to the size of the first operand.

5. The method of claim 1, wherein the location of the first operand is stored in a first register, the argument characters are stored in a second operand, and the location of the second operand is stored in a second register.

6. The method of claim 1, wherein the translation table is stored at a location designated by an address in a register.

7. The method of claim 1, wherein the translation table is stored on a double-word boundary in a memory.

8. The method of claim 1, wherein the predetermined test character is stored in a register.

9. The method of claim 1, wherein the test character comparison control field indicates that a test character comparison is to be performed when the test character comparison control field is equal to zero and the test character comparison control field indicates that a test character comparison is not be performed when the test character comparison control field is equal to one.

10. A system comprising a processor, the system configured to perform a method for executing a translate instruction, the translate instruction comprising an opcode field and a test character control field, the method comprising:
    responsive to the test character control field indicating that a test character comparison is to be performed, performing for successive argument characters of a predetermined number of argument characters:
       retrieving an argument character;
       based on the retrieved argument character, identifying a function character in a translation table of function characters;
       responsive to the identified function character being different than a predetermined test character, placing the identified function character into a first operand; and
       responsive to the identified function character being equal to the predetermined test character, performing:
          not placing the identified function character into the first operand; and
          setting a condition code indicating that a function character was equal to the predetermined test character; and
    responsive to the test character control field indicating that a test character comparison is not to be performed, performing for successive argument characters of the predetermined number of argument characters:
       retrieving an argument character;
       based on the retrieved argument character, identifying a function character in the translation table of function characters; and
       placing the identified function character into the first operand.

11. The system of claim 10, wherein the opcode field indicates a size of the argument characters, the size of the argument characters equal to one byte or two bytes.

12. The system of claim 10, wherein the opcode field indicates a size of the predetermined test character, the size of the predetermined test character equal to one byte or two bytes.

13. The system of claim 10, wherein the opcode field indicates a size of the first operand, the size of the first operand equal to one byte or two bytes, and wherein the size of the identified function character is equal to the size of the first operand.

14. A computer program product for executing a translate instruction in a computer system, the translate instruction comprising an opcode field and a test character control field, the computer program product comprising:
    a non-transitory tangible storage medium readable by a processing circuit and storing instructions for execution by the processing circuit for performing a method comprising:
    responsive to the test character control field indicating that a test character comparison is to be performed, performing for successive argument characters of a predetermined number of argument characters:
       retrieving an argument character;
       based on the retrieved argument character, identifying a function character in a translation table of function characters;
       responsive to the identified function character being different than a predetermined test character, placing the identified function character into a first operand; and
       responsive to the identified function character being equal to the predetermined test character, performing:

not placing the identified function character into the first operand; and setting a condition code indicating that a function character was equal to the predetermined test character; and responsive to the test character control field indicating that a test character comparison is not to be performed, performing for successive argument characters of the predetermined number of argument characters:

retrieving an argument character;

based on the retrieved argument character, identifying a function character in the translation table of function characters; and placing the identified function character into the first operand.

15. The computer program product of claim 14, wherein the opcode field indicates a size of the argument characters, the size of the argument characters equal to one byte or two bytes.

16. The computer program product of claim 14, wherein the opcode field indicates a size of the predetermined test character, the size of the predetermined test character equal to one byte or two bytes.

17. The computer program product of claim 14, wherein the opcode field indicates a size of the first operand, the size of the first operand equal to one byte or two bytes.

18. The computer program product of claim 14, wherein the opcode field indicates a size of the identified function character, the size of the identified function character equal to one byte or two bytes.

19. The computer program product of claim 14, wherein the location of the first operand is stored in a first register, the argument characters are stored in a second operand, and the location of the second operand is stored in a second register.

20. The computer program product of claim 14, wherein the test character comparison control field indicates that a test character comparison is to be performed when the test character comparison control field is equal to zero and the test character comparison control field indicates that a test character comparison is not be performed when the test character comparison control field is equal to one.

\* \* \* \* \*